Aug. 4, 1964
E. F. DUPUIS
3,143,359
CHILD'S COASTER WAGON
Filed Jan. 7, 1963
2 Sheets-Sheet 1
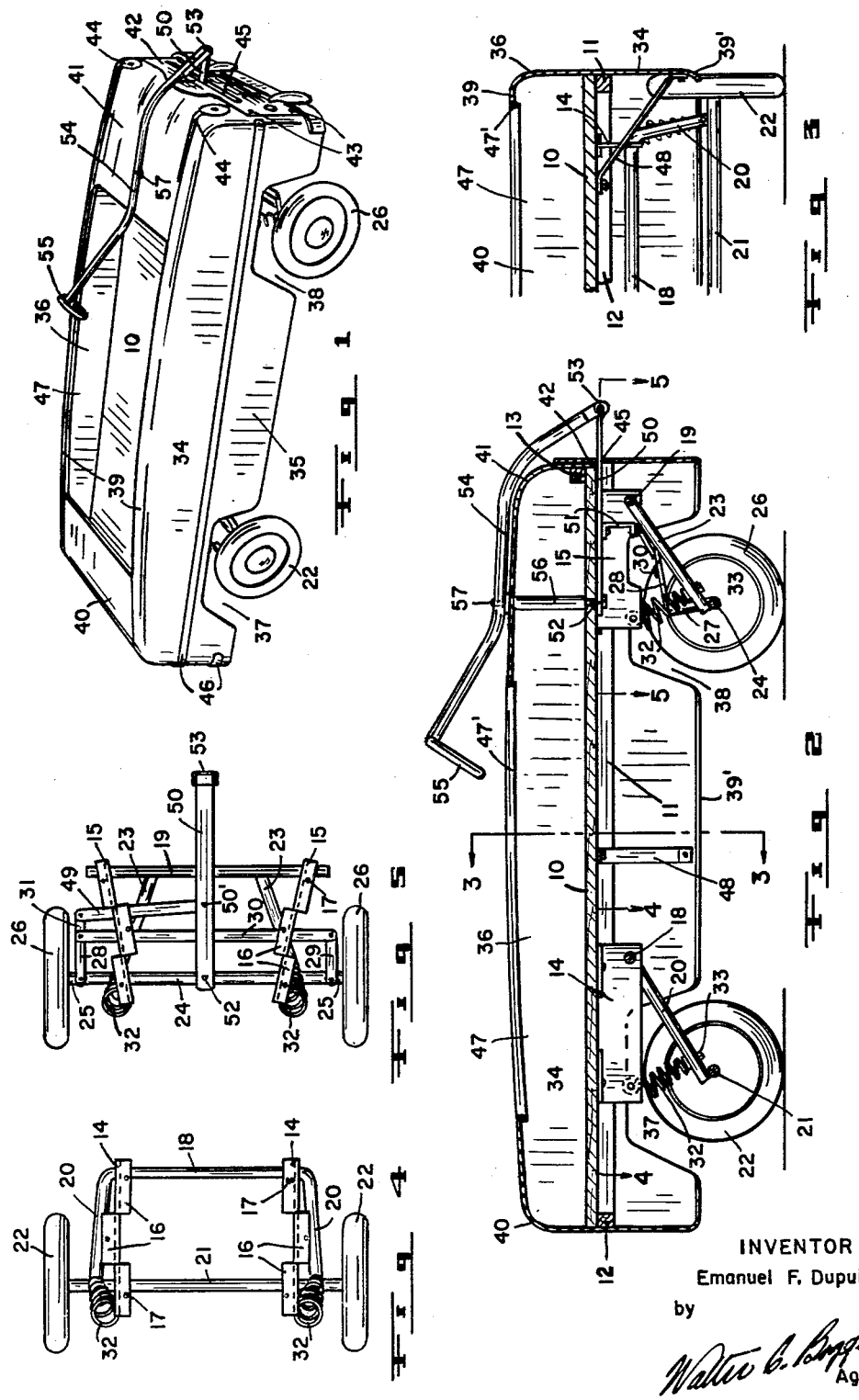
INVENTOR
Emanuel F. Dupuis Aug. 4, 1964  E. F. DUPUIS  3,143,359
CHILD'S COASTER WAGON
Filed Jan. 7, 1963  2 Sheets-Sheet 2

INVENTOR
Emanuel F. Dupuis
by
Agent

United States Patent Office 3,143,359
Patented Aug. 4, 1964

3,143,359
CHILD'S COASTER WAGON
Emanuel F. Dupuis, Box 31, St. Norbert,
Manitoba, Canada
Filed Jan. 7, 1963, Ser. No. 249,809
2 Claims. (Cl. 280—87.03)

This invention relates to a toy wagon of a modernistic type, and the principal objects thereof are: to provide a streamlined four wheeled vehicle having resilient support for the body portion thereof; automobile type steering at the front axle thereof; and said steering being operable by a manually controlled swingable tongue.

Further objects of the invention are: to provide a strong sturdy platform for the body of the vehicle; well reinforced for children's rough usage; and combine said reinforcements with the resilient support in a simple construction, including a pleasing body design.

With the above important and other minor objects in view, which will become more apparent as the description proceeds, the invention consists essentially in the design, construction and arrangement of the various parts hereinafter more particularly described, reference being had to the accompanying drawings wherein like characters of reference indicate corresponding parts in the several figures, and wherein:

FIGURE 1 is a perspective view of the toy wagon complete.

FIGURE 2 is an enlarged vertical longitudinal section through the wagon shown in FIGURE 1.

FIGURE 3 is a partial vertical cross section taken on the line 3—3, FIGURE 2.

FIGURE 4 is a horizontal sectional view taken on the line 4—4, FIGURE 2.

FIGURE 5 is a horizontal section taken on the line 5—5, of FIGURE 2.

Figure 6:
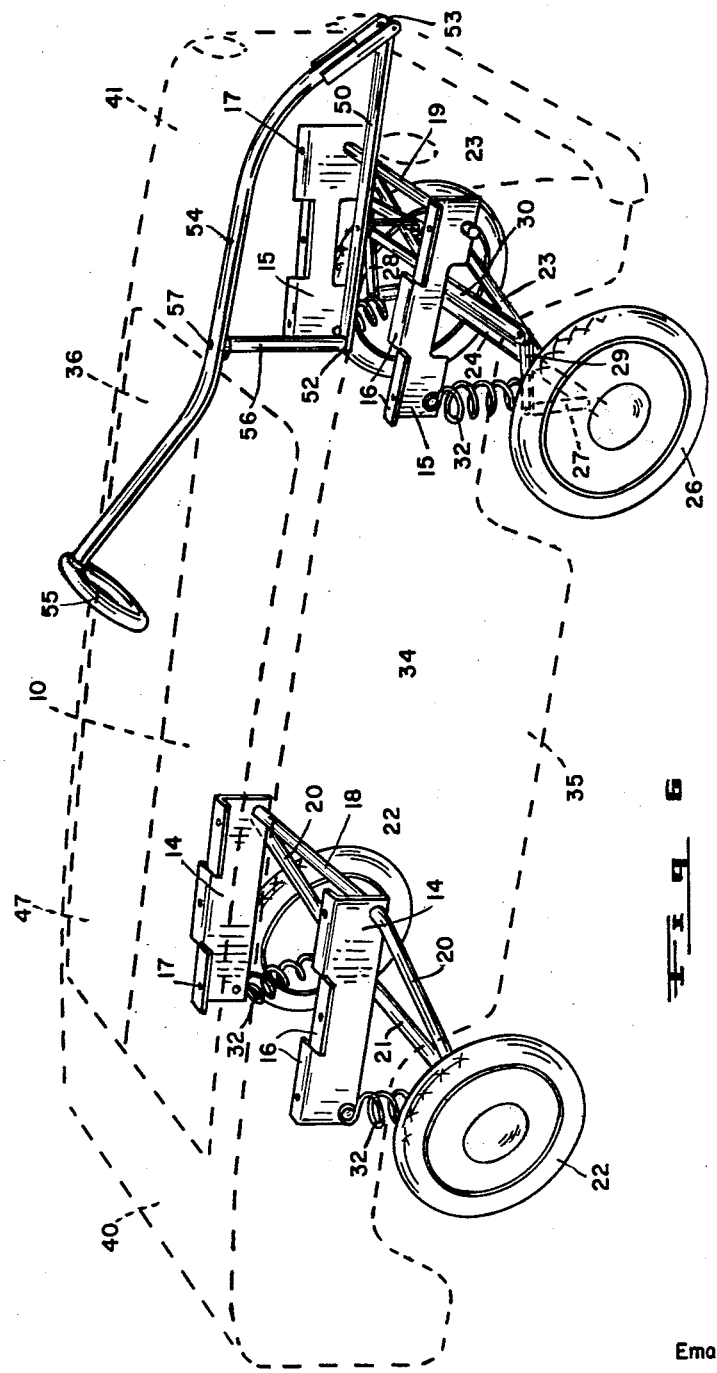
FIGURE 6 is an enlarged X-ray perspective view of the wagon shown in FIGURE 1, the undercarriage parts and steering being shown in full view while the body is shown in dotted outline.

A horizontal rectangular-shaped platform is shown at 10 in the drawings. The under part of this platform is strengthened along each outer side by relatively square-shaped rails 11, which extend the full length thereof. An under rail 12 extends across the rear end of the platform, and another upper rail 13 extends across the front end. The under part of the platform is further reinforced by two pairs of spaced vertical metal strips 14 and 15, a pair at each end thereof, which I term "saddle members." The upper edges of these saddle members are bent over in alternating right-angled flanges 16, best shown in FIGURE 6, and each flange is provided with a hole 17 for the reception of bolts or screws, to secure said saddle members to the platform. It will also be noted that the rear saddle members are positioned in parallel while the front ones are in spaced, angled relationship.

The front ends of the saddle members 14 and 15 are each provided with a hole therethrough to rotatably receive crank shafts 18 and 19 therethrough. The two ends of the rear crank shaft 18, after passing through the saddle members, are bent downwardly at a rearward angle, to form crank legs 20, and the extreme ends of these crank legs are welded or otherwise fastened to a rear axle 21, each end of which is rotatably supported on ground wheels 22. The front crank shaft 19 is straight and each end terminates on an outer side of one of its saddle members 15, after passing therethrough. Downwardly, rear sloping crank legs 23 have their upper ends welded to the central part of the crank shaft 19 while their lower ends are spread considerably wider and are welded in a similar manner to a front cross axle 24. Each end of this latter axle is pivotally connected to an extension stub spindle 25 which is rotatably supported on ground wheels 26. The spindles each carry short vertical standards 27, the upper ends of which are provided with forwardly extending cranks 28 and 29. These latter cranks are pivotally connected together by a cross bar 30 so they can be jointly operated or turned in the same direction, and so turn the ground wheels 26, when the cross bar is end shifted. It will also be noted that the crank 28 extends slightly past the bar 30, as shown at 31 (see FIGURE 5) for a purpose later explained.

The upper wide ends of vertical cone-shaped coil springs 32 are secured, one to each of the rear ends of the saddle members 14 and 15. The lower small-diametered ends of these springs are secured to the lower ends of the crank shaft legs, one to each leg as shown at 33 (see FIGURE 2). Accordingly, these coil springs resiliently support the platform 10 from the axles 21 and 24.

A body 34 is supported by the outer edges of the platform 10 and the reinforcing rails 11, 12 and 13. The body is in the form of a sectional shell and is designed somewhat in the shape of an automobile. This body consists of two spaced side sections 35 and 36 which are formed from pressed sheet metal, and they present front and rear fenders and the side of the automobile shape, suitable lower cut-outs 37 and 38 being provided to receive the ground wheels 22 and 26 above mentioned. The dished edges of these side sections also form the front and back of the fenders, including an overhanging lip 39 along the top and a strengthening lip 39' along the bottom. The side sections 35 and 36, at each end, are connected to relatively angular-shaped end sections 40 and 41, the section 40 closing the rear part of the vehicle in the manner of an automobile trunk or luggage compartment, while the section 41 closes off the front part, above the platform, in the suggested manner of an automobile hood, or engine cover. A pressed plate unit 42 is secured to the vertical part of the front section 41, extends therebelow, and is shaped to suggest an automobile front grill and bumper. This latter unit is secured by suitable screws or bolts, indicated at 43. Design-pressed overlays 44 are also provided on each side of the front section 41 to suggest headlights. It will also be noted that the grill and bumper unit 42 is provided with a horizontal cross slot 45, just below the platform.

By observing the above connected body sections, including the ground wheels, it will be seen that they produce the illusion of an automobile, and they can be suitably painted to enhance the illusion, such as suggested chrome streamlines as indicated at 46 in FIGURE 1. As the sections pass around the outer edges of the platform 10, and the reinforcing rails 11, 12 and 13, they can be nailed or screw secured thereto (not shown) for support of the body thereon. The upper interior edges of the sections terminate sufficiently back to provide an opening or well 47 for access to the platform 10. The edges of this opening can be finished with a suitable encircling beading, such as indicated at 47'. The lower central parts of the side sections 35 and 36 are also reinforced by angularly positioned straps 48 (see FIGURE 3) which bolt-connect said lower parts with the bottom of the platform 10.

The extending end 31 of the steering crank 28 (see FIGURE 5), pivotally receives one end of a pitman 49, the opposite end of which is pivotally connected at 50' to a central part of a horizontal control arm 50, through a U-shaped vertical bracket 51 (see FIGURE 2). The rear end of this control arm is pivotally connected under and to the platform at 52, while the front end extends ahead, through the slot 45 in the grill and bumper unit 42, to terminate exteriorly of the body in an eye 53. A Z-shaped tongue 54 is pivotally connected to this eye, curves upwardly and rearwardly therefrom, over the hood portion of the front end section 41, and then projects upwardly at a rearward angle to terminate in a manually operable steering ring 55, over the well opening 47. It should also be explained at this time that a vertical standard 56 has its lower end connected to the platform 10, directly above the pivot point 52 of the control arm. This standard projects upwardly to the end section 41, which it reinforces, and its upper end forms a pivot 57 for the tongue 54, so said tongue and the control arm can swing together on the same pivot for perfect control of the steering. If desired, the tongue can be released from the pivot 57 and be swung ahead on the eye 53, when the wagon is to be manually pulled.

From the above it will be seen that I have invented a streamlined toy wagon, preferably for children, which gives the modern appearance of an automobile. The loading platform of this vehicle will resiliently support weight, such as the knee of a boy, when he is exteriorly propelling same with one foot. It can be turned in the manner of an automobile, when the said boy operates the overhead ring 55 to swing the tongue. He can also steer the wagon when pulling the tongue. While this vehicle is created in a modernistic design, it is also extremely strong, being well reinforced to stand up to the strenuous conditions imposed by active children.

What I claim as my invention is:

1. A wagon, comprising: a platform; a pair of spaced, lengthwise, vertical saddle members secured under and to said platform to reinforce same; two pairs of axled ground wheels below said saddle members, a pair across each end of the platform; a pair of inverted U-shaped cranks, each having the legs thereof secured to one of the axles of said wheels, extending upwardly therefrom at an angle, and the central portion of each crank pivotally mounted in the saddle members; compression spring means between the saddle members and the axles of said wheels, one at each of said crank legs, for resiliently supporting the platform from the axles; stub axle type steering means for turning one pair of the ground wheels in the steering manner of an automobile; a shell body enclosing and supported by the platform, and presenting a central upper well opening thereto; a control bar connected to said steering means, for operation of same; one end of said control bar pivotally mounted under and to the platform, and the opposite end thereof extending ahead; an outer tongue having one end thereof connected to the extending end of the control bar, the central part of said tongue pivotally mounted on the body at a point above, and in alignment with, the pivot point of the control bar, and the opposite end of the tongue terminating over said well opening, for manual operation of the steering means therefrom.

2. A wagon, comprising: a rectangular platform; two lengthwise pairs of side-spaced vertical saddle members secured under and reinforcing said platform, a pair at each end thereof; two pairs of axled wheels positioned below said saddle members, a pair across each end of the platform; a pair of inverted U-shaped crank shafts, each having the legs thereof supported by and extending angularly upward from one of the axles of said wheels, and the central portions thereof pivotally connected to one end of a pair of said saddle members; compression spring means between the opposite ends of the saddle members and the axles, for resiliently supporting the platform from the axles; a sectional shell body carried by and enclosing the platform; said body comprising a pair of spaced interiorly overlying side sections connected by in-turned angular-shaped end sections; said body sections secured around and to the edges of the platform and presenting an upper central well entrance thereto; a grill and bumper unit carried by one of said end sections; said unit provided with a transverse slot therealong, below the platform; a stub-axle type steering mechanism for turning the axled wheels adjacent the unit; a lengthwise control bar for operating said steering mechanism; one end of said control bar pivoted under and to the platform and the other end thereof extending outwardly through said slot; a tongue having one end thereof connected to the outward end of the control bar, normally passing back over said latter end member and pivoted thereto at a point in vertical alignment with the pivot point of the control bar; and the opposite end of the tongue terminating over said well, for manual operation of the steering mechanism therefrom.

References Cited in the file of this patent
UNITED STATES PATENTS

| | | | |
|---|---|---|---|
| D. 96,296 | Blackmore | | July 23, 1935 |
| 436,320 | Stevens | | Sept. 9, 1890 |
| 2,027,522 | Eck | | Jan. 14, 1936 |
| 2,077,543 | Barthel | | Apr. 20, 1937 |
| 2,470,061 | Wheeler | | May 10, 1949 |
| 2,913,250 | LaFever | | Nov. 17, 1959 |